Nov. 26, 1946.　　　C. B. SPASE　　　2,411,600
OVERLOAD CLUTCH
Filed July 5, 1945
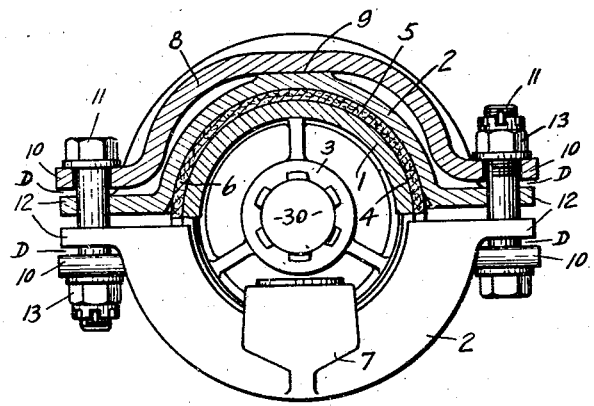
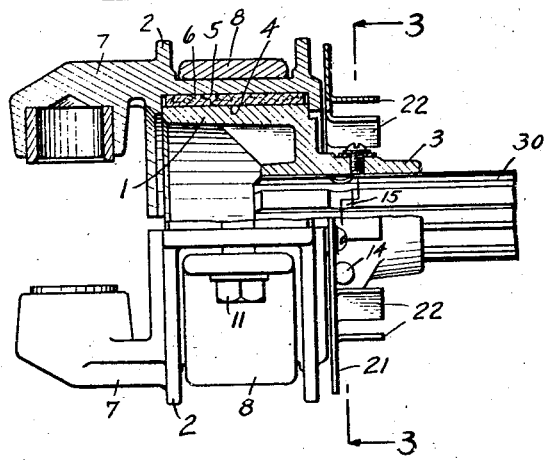
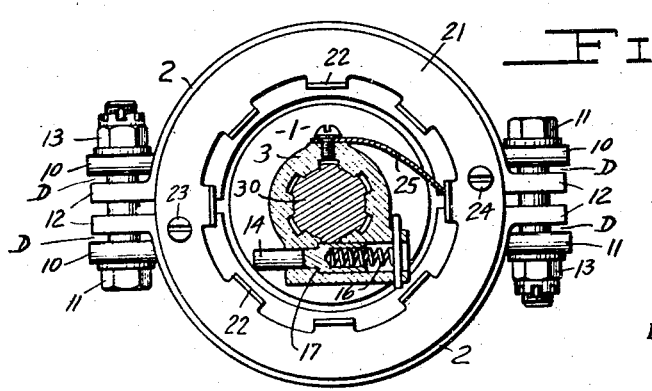
INVENTOR:
Charles B. Spase,
BY Bodell & Thompson
ATTORNEYS.

Patented Nov. 26, 1946

2,411,600

UNITED STATES PATENT OFFICE 2,411,600

OVERLOAD CLUTCH

Charles B. Spase, Nedrow, N. Y., assignor to Lipe-Rollway Corporation, Syracuse, N. Y., a corporation of New York Application July 5, 1945, Serial No. 603,330

2 Claims. (Cl. 64—30)

This invention relates to overload friction clutches and has for its object an overload or fixed load clutch in which the clutch may be readily adjusted and the amount of adjustment made or required to be made may be readily gaged or estimated. It further has for its object such a clutch in which the frictional engagement and adjustment is made and held through spring levers, arcuate in general form, and pressing intermediate of their ends on friction sections or shoes of one of the members of the clutch, with means for clamping the springs for the opposing shoes of one of the members toward each other, so that the shoes frictionally engage another member of the clutch with a predetermined friction, or so that the clutch will slip upon the application of a predetermined load. The clutch is particularly adapted for transmitting motion to mechanisms, as drive mechanisms, for agricultural machines, etc. where the clutch slips when the tool being actuated engages an obstruction, the clutch slipping in order to prevent damage to the tool. It is also particularly designed for power take offs and tractors, pulling instruments having movable tools, which are actuated by power from the tractor through the power take off.

The invention consists in the novel features and in the combinations and constructions hereinafter set forth and claimed.

In describing this invention, reference is had to the accompanying drawing in which like characters designate corresponding parts in all the views.

Figure 1 is an end elevation, partly in section, of a clutch embodying this invention.

Figure 2 is a side elevation, partly in section.

Figure 3 is an elevation taken on line 3—3, Figure 2.

This clutch includes, generally, driving and driven members having coacting friction faces concentric with the axis of the clutch, the outer of the concentric members being composed of arcuate sections having means for clamping the sections against the inner clutch member with a predetermined friction, this clamping means including spring levers pressing between their ends on the sections respectively, and means common to both levers for clamping the ends of the levers toward each other.

1 designates one of the clutch members, as the driving member, and 2 the driven member. The driving member is here shown in the form of a drum having a hub 3 which is splined on a drive shaft 30. The drum of the driving member 1 is formed with a peripheral friction surface 4. The driven member 2 includes opposing arcuate sections having an internal friction face 5 opposed to the face 4 of the drum.

6 is a band of friction material between the faces 4, 5. Preferably, this band 6 is merely fixed between these two faces and is not rigid or otherwise secured in position. Each of the members 2 is formed with yoke arms 7 located diametrically opposite each other, which are provided with bearings for one set of trunnions of a universal joint. 8 designates the clamping spring, there being one spring for each section of the driven member 2. These springs are arcuate in form and embrace the sections 2. The springs press at 9 intermediate of their ends against the sections of the driven member 2. The springs are provided with outwardly extending lugs 10 at their ends and the ends of the springs are clamped toward each other by clamping members, as bolts 11, common to both springs, there being a bolt at like ends of the springs. The bolts 11 extend through laterally extending ears 12 on the sections of the driven member 2 and located between the lugs 10. The nuts 13 on the bolts may be tightened to flex or load the springs 8 a predetermined amount and the amount may be gaged by the distance at D between the lugs 10 of either spring 8 and the opposing surface of the lug 12 on the sections of the member 2.

To adjust the friction between the clutch members, so that the clutch members slip when a predetermined overload is reached, it is merely necessary to tighten or loosen the nuts 13, more or less, on the bolts 11 and gage the distance D. If desired, a micrometer scale may be provided permanently on the clutch to gage this distance.

For the purpose of retaining the hub 3 of the drum on its splined shaft, the hub is formed with a tangentially extending spring-pressed key 14 which extends transversely through a peripheral groove 15 in the splines of the drive shaft. When the hub is being placed on the drive shaft, the key is held depressed against the action of its spring 16 and when the hub is in position and the shoulder 17 is lined up with the peripheral groove 15 in the shaft or the splines thereof, the key may be released and the spring will re-act, pressing the shoulder 17 of the key into the groove 15, thus locking the hub from axial displacement.

A suitable alarm, as a clapper, is used to notify the operator when the clutch is slipping, that is, when the tool has encountered an obstruction. As here shown, this clapping device includes an annular member 21 usually formed of sheet metal and mounted concentric with the hub 3, this being shaped to form serrations or teeth 22. The ring 21 is secured by one fastening member, as a screw 23, to one of the sections of the driven member 2 and by a screw 24 to the other of said sections. The clapping device also includes a resilient striker 25 anchored to the hub 3 at one end and having its free end co-acting with the teeth 22 and normally up on the high point of one of the teeth.

When the tool, which is connected through a universal joint to the sections 2 of the driven member, encounters an obstruction, unduly retarding rotation, the ring 21 will be moved circumferentially relatively to the driving member 1 during the slipping, causing the striker or tongue 25 to clash over the teeth 22.

What I claim is:

1. An overload clutch including outer and inner driving and driven members having coacting friction faces concentric with the axis of the clutch, the outer member being formed of opposing sections, and means for clamping the sections toward each other onto the inner member, the clamping means including arcuate springs embracing the sections respectively, one spring for each section, the springs bearing intermediate of their ends on the sections respectively and means for clamping the ends of the springs toward each other.

2. An overload clutch including outer and inner driving and driven members having coacting friction faces concentric with the axis of the clutch, the outer member being formed of opposing sections, means for clamping the sections toward each other onto the inner member, the clamping means including arcuate springs embracing the sections respectively, one spring for each section, the springs bearing intermediate of their ends on the sections respectively and means for clamping the ends of the springs toward each other, each of the sections having opposing yoke arms forming a part of the universal joint.

CHARLES B. SPASE.